(12) United States Patent
Jiang et al.

(10) Patent No.: US 11,775,635 B2
(45) Date of Patent: Oct. 3, 2023

(54) AUTONOMOUS DETECTION OF CACHE-BASED SIDE-CHANNEL ATTACKS

(71) Applicant: NEC Laboratories Europe GmbH, Heidelberg (DE)

(72) Inventors: Jianyu Jiang, Pokfulam (HK); Ghassan Karame, Heidelberg (DE); Claudio Soriente, Madrid (ES)

(73) Assignee: NEC CORPORATION, Tokyo (JP)

( * ) Notice: Subject to any disclaimer, the term of this patent is extended or adjusted under 35 U.S.C. 154(b) by 758 days.

(21) Appl. No.: 16/826,319

(22) Filed: Mar. 23, 2020

(65) Prior Publication Data

US 2021/0192045 A1     Jun. 24, 2021

Related U.S. Application Data

(60) Provisional application No. 62/952,513, filed on Dec. 23, 2019.

(51) Int. Cl.
| | |
|---|---|
| *G06F 21/55* | (2013.01) |
| *G06F 21/53* | (2013.01) |
| *G06N 5/04* | (2023.01) |
| *G06N 20/00* | (2019.01) |

(52) U.S. Cl.
CPC ............ *G06F 21/554* (2013.01); *G06F 21/53* (2013.01); *G06N 5/04* (2013.01); *G06N 20/00* (2019.01); *G06F 2221/034* (2013.01)

(58) Field of Classification Search
CPC .................................................. G06F 21/554
See application file for complete search history.

(56) References Cited

U.S. PATENT DOCUMENTS

| | | | | |
|---|---|---|---|---|
| 2017/0142072 | A1* | 5/2017 | Reubenstein | ....... H04L 63/1441 |
| 2018/0341600 | A1* | 11/2018 | Schuster | ............ G06F 12/0806 |
| 2021/0192045 | A1* | 6/2021 | Jiang | ..................... G06F 21/554 |

FOREIGN PATENT DOCUMENTS

| | | | | |
|---|---|---|---|---|
| WO | WO-2019140274 | A1 * | 7/2019 | ............. G06F 21/12 |
| WO | WO-2020217043 | A1 * | 10/2020 | ......... G06F 12/0864 |

OTHER PUBLICATIONS

Oleksenko, Oleksii et al. "Varys: Protecting SGX enclaves from practical side-channel attacks," USENIX ATC '18, Jul. 11-13, 2018, Boston, MA, USA.

Chen, Guoxing et al. "Racing in Hyperspace: Closing Hyper-Threading Side Channels on SGX with Contrived Data Races," 2018 IEEE Symposium on Security and Privacy, May 21-23, 2018.

\* cited by examiner

*Primary Examiner* — Saleh Najjar
*Assistant Examiner* — Simon Kanaan
(74) *Attorney, Agent, or Firm* — Leydig, Voit & Mayer, Ltd.

(57) ABSTRACT

A method for detecting a cache-based side-channel attack includes utilizing a timer thread that continuously increments a variable in code of an application. The code has been instrumented such that the instrumented code uses the variable incremented by the timer thread to infer an amount of time taken for running a part of the code. A number of cache misses during execution of the part of the code is determined based on the amount of time. It is determined whether the application is experiencing the cache-based side-channel attack using a classifier which uses as input the number of cache misses.

20 Claims, 6 Drawing Sheets

AUTONOMOUS DETECTION OF CACHE-BASED SIDE-CHANNEL ATTACKS

CROSS-REFERENCE TO PRIOR APPLICATION

Priority is claimed to U.S. Provisional Patent Application No. 62/952,513 filed on Dec. 23, 2019, the entire contents of which is hereby incorporated by reference herein.

FIELD

The present invention relates to a method and system for detecting and preventing side-channel attacks which exploit shared cache resources in central processing unit (CPUs).

BACKGROUND

Side-channel attacks based on shared resources enable a malicious process to infer secret information of a victim. For example, if the victim's memory access depends on the value of a secret (e.g., a private key), a malicious process could learn the secret by monitoring how the victim accesses the memory.

Prominent side-channels attacks use shared caches available in modern processors. Depending on the cores where the victim and attacker process are running, cache-based side-channels can be partitioned in same-core and cross-core attacks. Same-core attacks require the victim and the attacker to run on the same core and exploit L1 and L2 caches. Cross-core attacks can be executed even when the victim and the attacker run on different cores of the same CPU and exploit L3 cache, since L1 and L2 caches are core-private.

Most side-channel attacks fall into one of two categories: prime-and-probe or flush-and-reload. In a prime-and-probe attack, the attacker starts by priming the cache, i.e., filling it with its own data. After the priming phase, the attacker waits for a fixed amount of time to let the victim run. Finally, in the probing phase the attacker fetches data that occupied a given cache line during the priming phase. Fetching time allows the attacker to distinguish whether the victim touched that cache line during its execution, i.e., if the victim requested a memory address that was cached at that specific cache line. If fetching is slow, the victim has accessed memory that maps to that specific cache line. On the other hand, if fetching is fast, the victim has not accessed memory that maps to that cache line. In a flush-and-reload attack, the attacker starts by flushing the cache. After flushing, the attacker waits for a fixed amount of time to let the victim run. Finally, in the reload phase the attacker fetches data that would be cached at a specific cache line. As in a prime-and-probe attack, the fetching time allows the attacker to distinguish whether the victim has accessed a given memory address during its execution.

SUMMARY

In an embodiment, the present invention provides a method for detecting a cache-based side-channel attack. The method includes utilizing a timer thread that continuously increments a variable in code of an application. The code has been instrumented such that the instrumented code uses the variable incremented by the timer thread to infer an amount of time taken for running a part of the code. A number of cache misses during execution of the part of the code is determined based on the amount of time. It is determined whether the application is experiencing the cache-based side-channel attack using a classifier which uses as input the number of cache misses.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
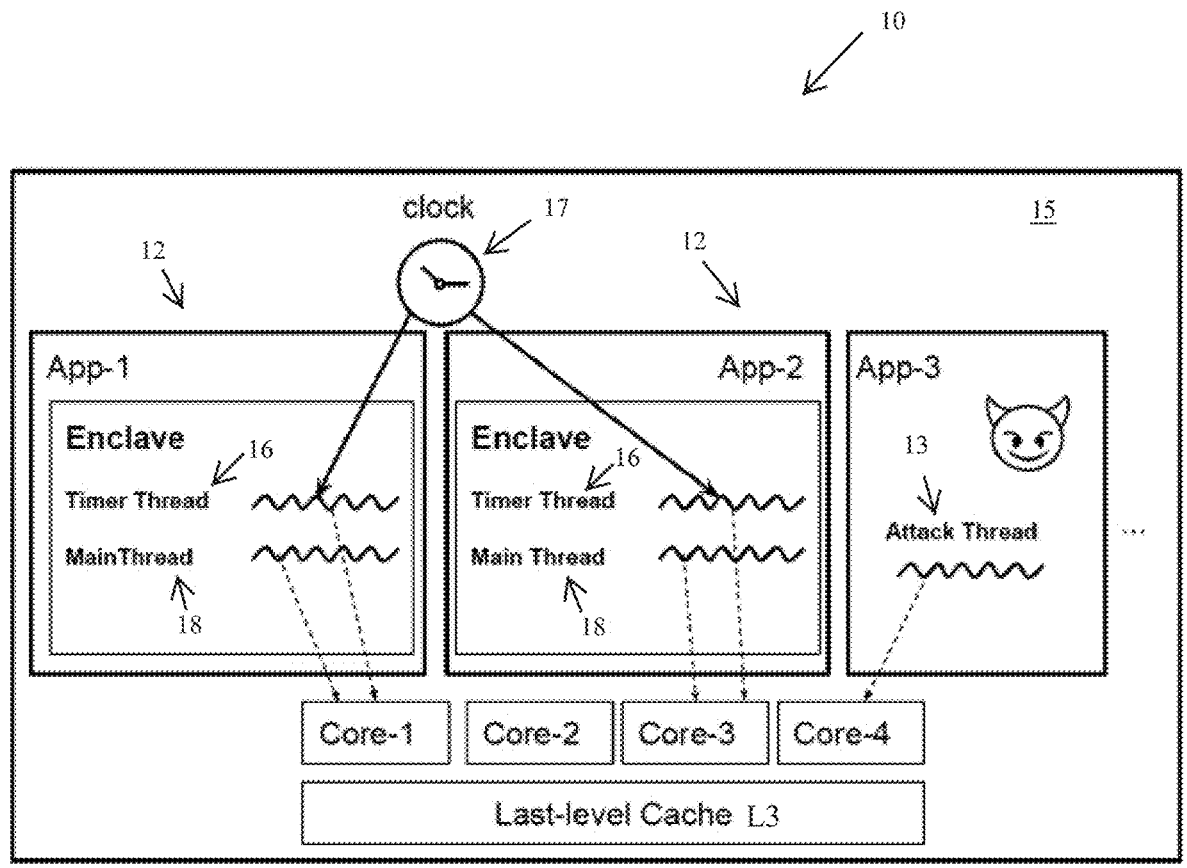
FIG. 1 schematically illustrates a system for detecting side-channel attacks according to an embodiment of the present invention.

Embodiments of the present invention enable the detection of side-channel attacks that exploit shared cache resources in modern CPUs. In particular, the inventors have recognized that, in both prime-and-probe and flush-and-reload side-channel attacks, the adversary manipulating the cache shared with the victim results in the victim being likely to experience a number of cache misses (i.e., the requested memory address is not mapped to cache) that is higher than the number of cache misses it would experience if no attack is underway. Accordingly, a process under attack is likely to experience a high number of cache misses. These cache misses can be detected by the process in accordance with embodiments by providing access to a trusted timer. Embodiments of the present invention implement the trusted timer as a thread separate from the main application thread. The main application thread leverages the timer thread to counts its cache misses and uses this number to estimate the probability of being a victim of a cache-based side-channel attack. The mechanisms according to embodiments of the present invention allow to detect attacks without relying on services provided by the operating system (OS), such as trusted timers or performance counters. Accordingly, embodiments of the present invention can be particularly advantageously applied to trusted execution environment (TEE) applications where no performance counters or trusted sources of time are available.

Trusted timers or performance counters to determine the number of cache misses are typically services made available by the OS. In contrast, embodiments of the present invention provide a detection mechanism for cache-based side-channels attacks that does not require trusted timers or performance counters as services of the OS. In particular, the detection mechanism relies on the fact that the time consumed by a memory access depends on whether the accessed address is mapped to cache or not. By timing the access to the address, the application can infer a cache hit or miss. As such, as already mentioned above, embodiments of the present invention are particularly suited for applications running in TEE such as INTEL SGX where no performance counters or trusted sources of time are available.

A system according to an embodiment of the present invention can be implemented in a cloud scenario where the cloud provider offers TEE-enabled hosts to users. The users run their application on the remote hosts of the cloud so that applications from different users run on the same hosts. It is assumed that applications run all or part of their code within the TEE of the hosts. For example, if the TEE is instantiated by INTEL SGX, it is assumed the applications run in enclaves. Embodiments of the present invention are able to detect cache-based side-channel attacks at different cache levels depending on whether applications can have a core reserved. Core reservation can be achieved by using the "core affinity" feature of the OS. Alternatively, core reservation can be achieved by using core-reservation techniques described in Oleksii Oleksenko, et al., "Varys: Protecting SGX Enclaves from Practical Side-Channel Attacks," USENIX Annual Technical Conference, pp. 227-240 (2018) or Guoxing Chen, et al., "Racing in Hyperspace: Closing Hyper-Threading Side Channels on SGX with Contrived Data Races," IEEE Symposium on Security and Privacy, pp. 178-194 (2018), each of which is hereby incorporated by reference herein.

If core reservation is available, an embodiment of the present invention detects side-channel based on last-level cache (also known as L3 cache). This is because core reservation rules out attacks based on L1 and L2. If core reservation is not available, embodiments of the present invention can be used to detect side-channel based on any cache.

In an embodiment, the present invention provides a method for detecting a cache-based side-channel attack. The method includes utilizing a timer thread that continuously increments a variable in code of an application. The code has been instrumented such that the instrumented code uses the variable incremented by the timer thread to infer an amount of time taken for running a part of the code. A number of cache misses during execution of the part of the code is determined based on the amount of time. It is determined whether the application is experiencing the cache-based side-channel attack using a classifier which uses as input the number of cache misses.

In an embodiment, the number of cache misses is determined by comparing the amount of time to a threshold.

In an embodiment, the application runs in an enclave of a host of a cloud provider which implements a trusted execution environment.

In an embodiment, the timer thread is implemented separately from a main thread of the application.

In an embodiment, the timer thread is implemented in a same enclave of a trusted execution environment as the application.

In an embodiment, the application runs in an enclave of a trusted execution environment, and the timer thread is implemented outside of the enclave and on a different core of a host than the enclave.

In an embodiment, the classifier is trained by running applications in a controlled environment with different cache configurations and/or while running a cache-based side-channel attack, collecting a number of cache misses during execution, and using the number of cache misses to generate a classification model used by the classifier.

In an embodiment, the method further comprises aborting execution of the application based on the classifier determining the application is experiencing the cache-based side-channel attack.

In an embodiment, the timer thread is not a service provided by an operating system running the application.

In an embodiment, the instrumented code of the application is instrumented to access a computer register containing a current value of the variable at least twice during execution of the part of the code.

In an embodiment, the instrumented code of the application is instrumented to access the computer register before and after each memory access instruction, and the number of cache misses is determined based on a total number of times during execution of the part of the code that a time elapsed for one of the memory access instructions exceeds a threshold.

In an embodiment, the instrumented code of the application is instrumented to perform a conditional jump and to access the computer register before and after the conditional jump.

In another embodiment, the present invention provides a system comprising one or more processors which, alone or in combination, are configured to provide for execution of a method according to an embodiment of the present invention. In an embodiment of the system, the application runs in an enclave of a host of a cloud provider which implements a trusted execution environment.

In a further embodiment, the present invention provides a tangible, non-transitory computer-readable medium having instructions thereon which, upon being executed by one or more processors, alone or in combination, provide for execution of a method according to an embodiment of the invention.

FIG. 1 shows a system 10 according to an embodiment of the present invention where multiple application enclaves 12 running applications App-1 and App-2 run on a host 15 where a malicious application App-3 is also running. The applications App-1, App, 2, App-3 have cores reserved to themselves and all of the applications App-1, App, 2, App-3 share the last-level cache L3, also known as L3 cache. In this example, application App-1 runs on a first core core-1, application App-2 runs on a third core core-3 and the malicious application App-3 runs on a fourth core core-4, while a second core core-2 is empty. The cores core-1, core-2, core-3, core-4 are cores of a CPU of the host 15. The malicious application App-3 runs an attack thread 13 which, for example, is designed to implement a prime-and-probe or a flush-and-reload attack. Embodiments of the present invention can be particularly advantageously applied in TEEs where the OS does not offer a trusted timer or performance counters. In order that the cache is shared, a victim application such as application App-1 and/or App-2 runs on the same CPU as the adversary, such as the malicious application App-3.

An embodiment of the present invention aims at preventing the cloud operator or any other application running in the cloud, such as the malicious application App-3, from inferring secrets in the application enclaves 12, including through side-channels. To do so, an embodiment of the present invention instruments the applications App-1 and App-2 running in the application enclaves 12 with a separate timer thread 16 that uses a clock 17 to act as a timer, in particular, by continuously incrementing a variable shared between a main thread 18 of the applications App-1 and App-2 and the timer thread 16, as illustrated in FIG. 1.

Figure 2:
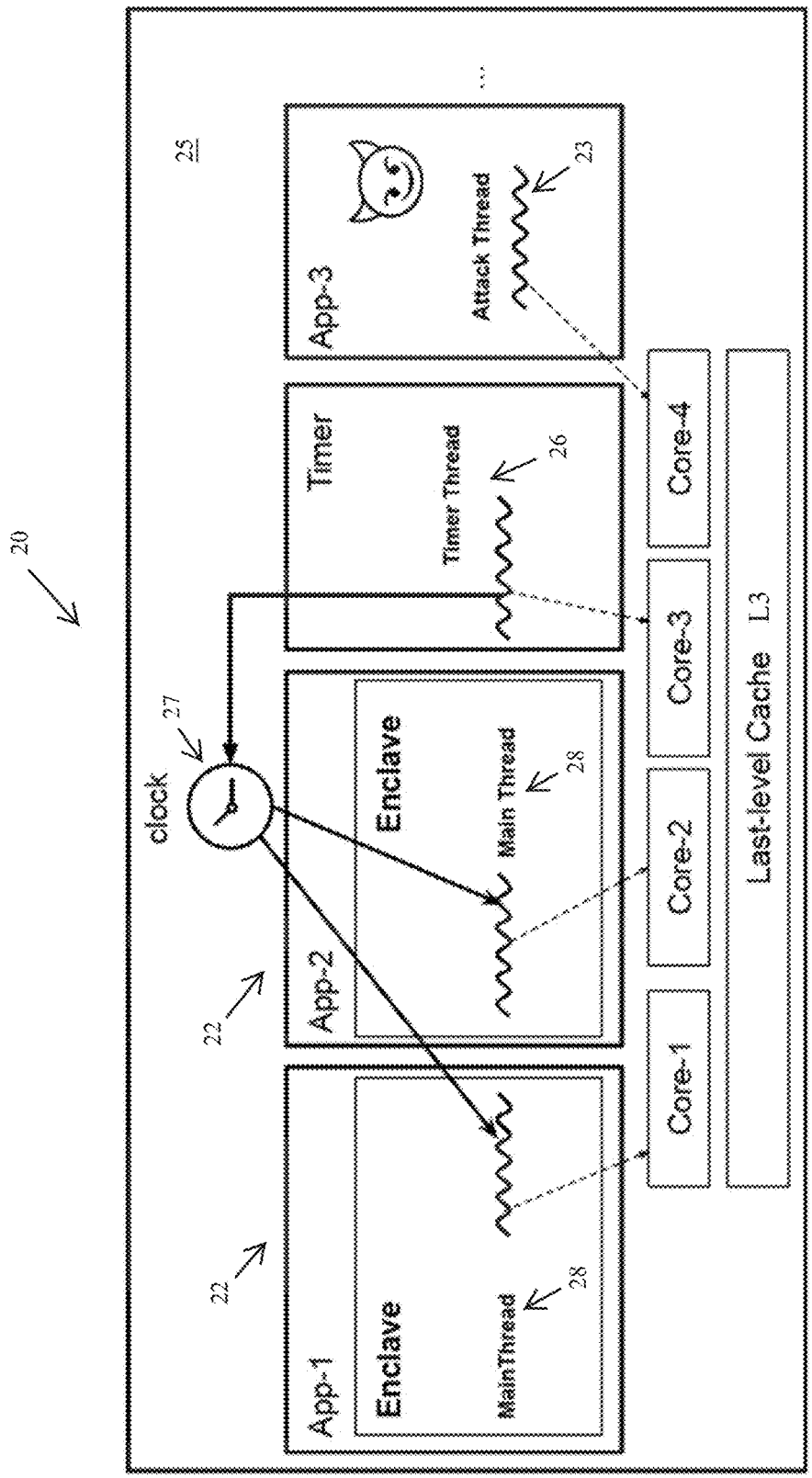
FIG. 2 schematically illustrates a system for detecting side-channel attacks according to another embodiment of the present invention.

In an alternative embodiment, a system 20 as shown in FIG. 2 uses a single timer thread 26 which increments a variable for multiple applications running on a host 25, for example the applications App-1 and App-2. As in FIG. 1, a malicious application App-3 running an attack thread 23 which is, for example, designed to implement a prime-and-probe or a flush-and-reload attack also runs on the host 25. In this example, the timer thread 26 and the malicious application App-3 may or not also run in an enclave. The main threads 28 of the Applications App-1 and App-2 can determine the number of clock cycles of a clock 27 which have elapsed between two reads of the variable incremented by the timer thread 26 and, in turn, can determine the number of clock cycles consumed to run a piece of its code. In this example, the applications App-1 and App-2 can run in application enclaves 22 as in the embodiment of FIG. 1. In this example, the application App-1 runs on a first core core-1, the application App-2 runs on a second core core-2, the timer thread 26 runs on a third core core-3 and the malicious application App-3 runs on a fourth core core-4.

Figure 3:
FIG. 3 shows exemplary pseudo code for a timer thread.

FIG. 3 shows an embodiment of the timer thread 16 and 26 of FIGS. 1 and 2. As shown in FIG. 3, the timer thread 16 or 26 simply updates a shared variable cnt by one in a busy loop. FIG. 3 shows a loop where the variable cnt is incremented by 1 at each cycle. Alternatively, the variable cnt could be incremented by any constant or even by a value determined by a pseudo-random function initialized with a secret seed. In the latter case, the secret seed must be available to the main threads 18 or 28 of the applications App-1 and App-2. In any of the cases, the main thread 18 or 28 can compute elapsed time by comparing the values of two different accesses to the variable cnt. Specifically, the main thread 18 or 28 first reads the variable cnt before a given sequence of instructions (this time is denoted as cnt1). After the execution of the given sequence of instructions, the main thread 18 or 28 reads the variable cnt again (this time is denoted as cnt2). Thus, the main thread 18 or 28 can infer the execution time of the instruction sequence as the time difference between the reads (cnt2−cnt1). Since executions time depends on whether data is in cache or nor, longer execution times allow to infer that the data was not cached.

An embodiment of the present invention instruments the code of the applications App-1 and App-2 to measure its cache misses using the timer thread 16 or 26. For example, each memory access instruction can be timed by comparing the value read from the variable cnt before and after its execution. A memory access instruction will take X clock ticks if the data stored at the accessed address is also stored in cache. Otherwise, if the data is not stored in cache, the memory access instruction will take Y clock ticks, where X<<Y. Preferably, the time taken for each memory access instruction is checked and the amount of time can be compared to a threshold to decide whether the data stored at the accessed address is also stored in cache.

Figure 4A:
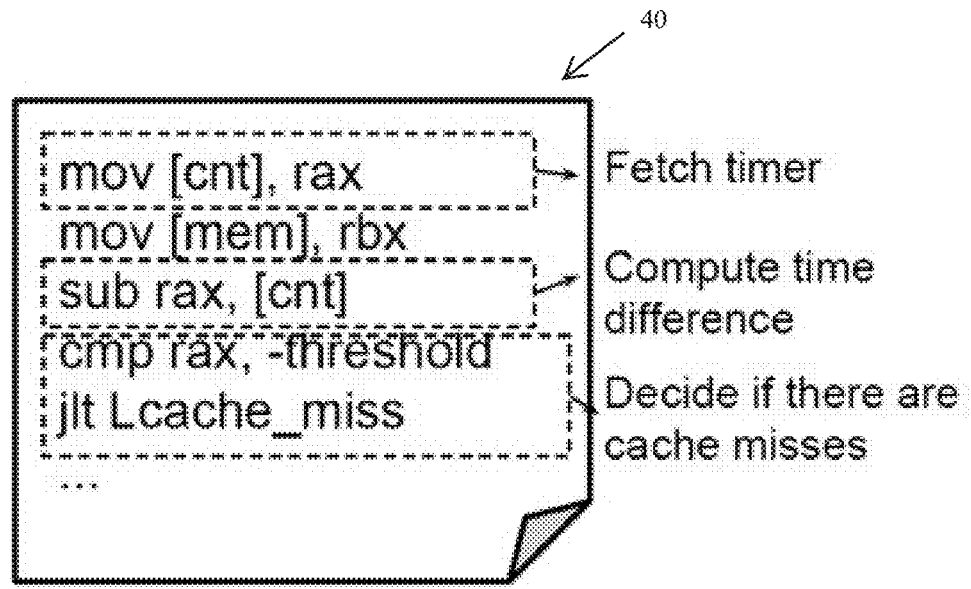
FIG. 4A shows instrumented code for a simple memory load instruction.

FIG. 4A shows an example of instrumented code 40 for a simple memory load instruction. The instrumented code 40 first fetches the timer and loads the value of the variable cnt to CPU register rax (mov [cnt], rax), executes a memory load instruction to CPU register rbx (mov [mem], rbx) and then retrieves a new or current value of the variable cnt and computes the difference between the new or current value and the old value stored in the CPU register rax to get the execution time of the memory load instruction (sub rax, [cnt]). The memory load instruction (mov [mem], rbx) is part of the original or ordinary application code while the other instructions in FIG. 4A are instrumented into the original or ordinary application code. The instrumented code 40 then compares the elapsed time with a pre-defined threshold to decide whether there was a cache miss or not (cmp rax, −threshold). The instrumented code 40 provides a conditional branch based on this comparison which jumps to another piece of code labelled Lcache-miss in a case that a cache miss is detected (jlt Lcache_miss). This code can then keep track of the number of cache misses over time and detect side-channel attacks based thereon.

Figure 4B:
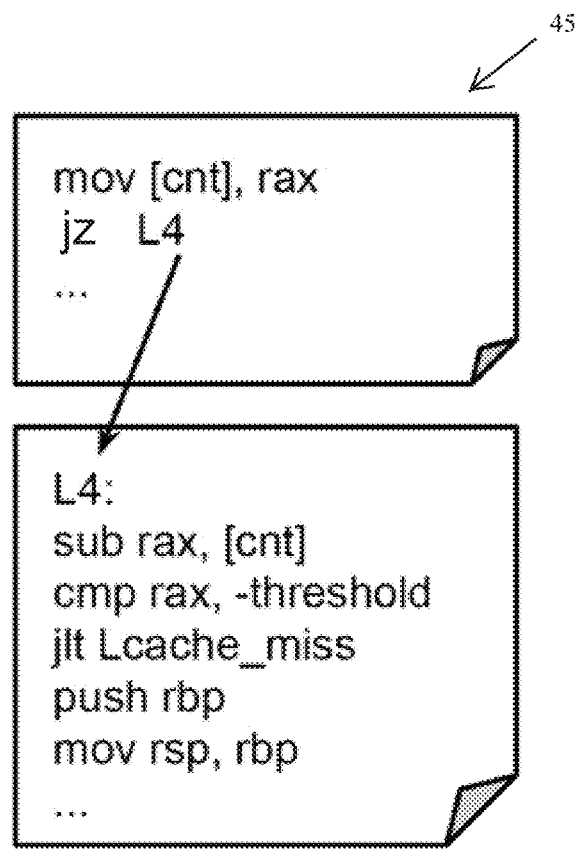
FIG. 4B shows instrumented code for a control flow instructions.

To detect cache misses of control flow instructions, time measurement code is injected to a call site and its callee, that is right before pointing to an instruction or piece of code, and right after the start of the execution of that instruction or piece of code. FIG. 4B shows an example of instrumented code 45 for a control flow instruction. In one piece of the instrumented code 45 (shown in the upper box of FIG. 4B), the program jumps to L4 (jz L4), which is located in another piece of the instrumented code 45 (shown in the lower box of FIG. 4B), if the value of a specific register is 0. Before jumping to L4, the instrumented code 45 saves the value of the timer variable cnt into the CPU register rax (mov [cnt], rax). After jumping to L4, the elapsed time is computed by retrieving a new or current value of the variable cnt and subtracting the new or current value from what was the old value that was saved in the CPU register rax (sub rax, [cnt]). The instrumented code 45 compares the elapsed time with a pre-defined threshold value (cmp rax, −threshold) and provides a conditional branch based on this comparison which jumps to another piece of code labelled Lcache-miss in a case that a cache miss is detected (jlt Lcache_miss). As above, the piece of code labelled Lcache_miss would take care of the scenario where a cache miss is detected. The two remaining instructions (push rbp and mov rsp, rbp) are the original or ordinary code (without instrumentation to detect and handle cache misses). Accordingly, after the CPU fetches the code into cache (if necessary), the target code starts execution. However, instead of directly starting execution, the instrumented code 45 first reads the post-execution timer value and checks if the elapsed time exceeds a threshold. In FIG. 4B, the conditional jump (jz L4) is therefore instrumented using similar code to the memory load instruction of FIG. 4A (mov [mem], rbx).

Since instrumenting all instructions of an application leads to sensible overhead, an embodiment of the present invention provides that developers annotate memory accesses that may leak secret information via side-channels. For example, this could be a secret-dependent conditional branch in ElGamal encryption, or secret-dependent table lookups in advanced encryption standard (AES).

An embodiment of the present invention also instruments the application with a classifier that, given the number of cache misses consumed to execute a piece of code, computes the probability that the process is being victim of a cache-based side-channel attack. For each function of the application, a cache miss counter is defined. When a cache miss occurs, the counter is incremented by one. Specifically, the counter is updated in cache miss shown in FIGS. 4A and 4B. These cache miss counters are used as features to classify if an enclave is under cache attacks.

The classifier to detect side-channel attacks according to embodiments of the present invention is trained preferably during an offline phase where the application is run multiple times in a controlled environment with different cache configurations and/or while running different cache-based side-channel attacks. Cache misses at each execution are fed to the classifier. Additional features may include the CPU architecture and other hardware features.

Figure 5:
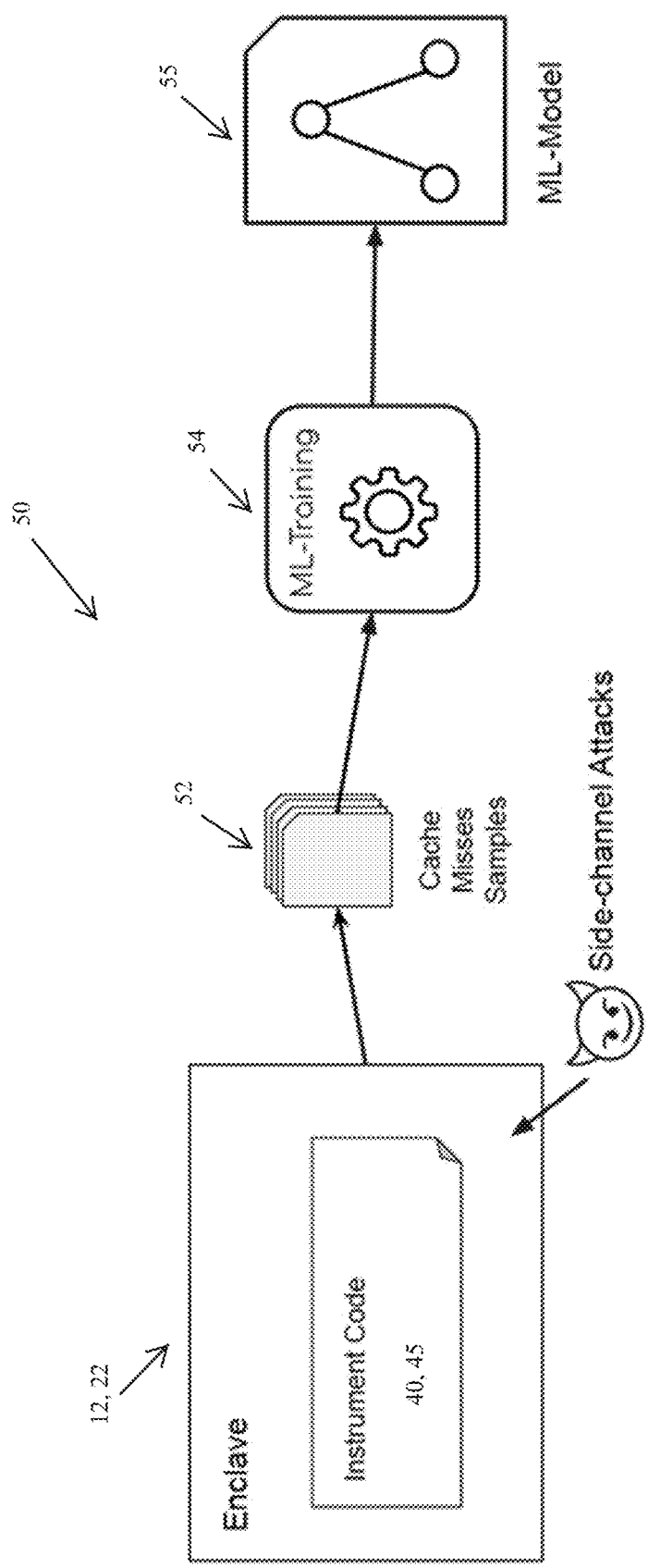
FIG. 5 schematically illustrates a method for training machine learning (ML) model according to an embodiment of the present invention.

FIG. 5 depicts a training process 50 according to an embodiment of the present invention. The cache misses samples 52 are collected from the applications running with instrumented code 40 or 45 within application enclaves 12 or 22 and are used to create a classification model by machine learning (ML), or an ML model 55. The ML training 54 of the ML model 55 is preferably run outside of the enclaves 12 or 22 so as to speed up training (e.g., using a graphics processing (GPU)). Different classifiers, e.g., based on simple threshold, or Naïve Bayes, support vector machine (SVM), decision tree and random forest can be used for training and detecting cache side-channel attacks.

Figure 6:
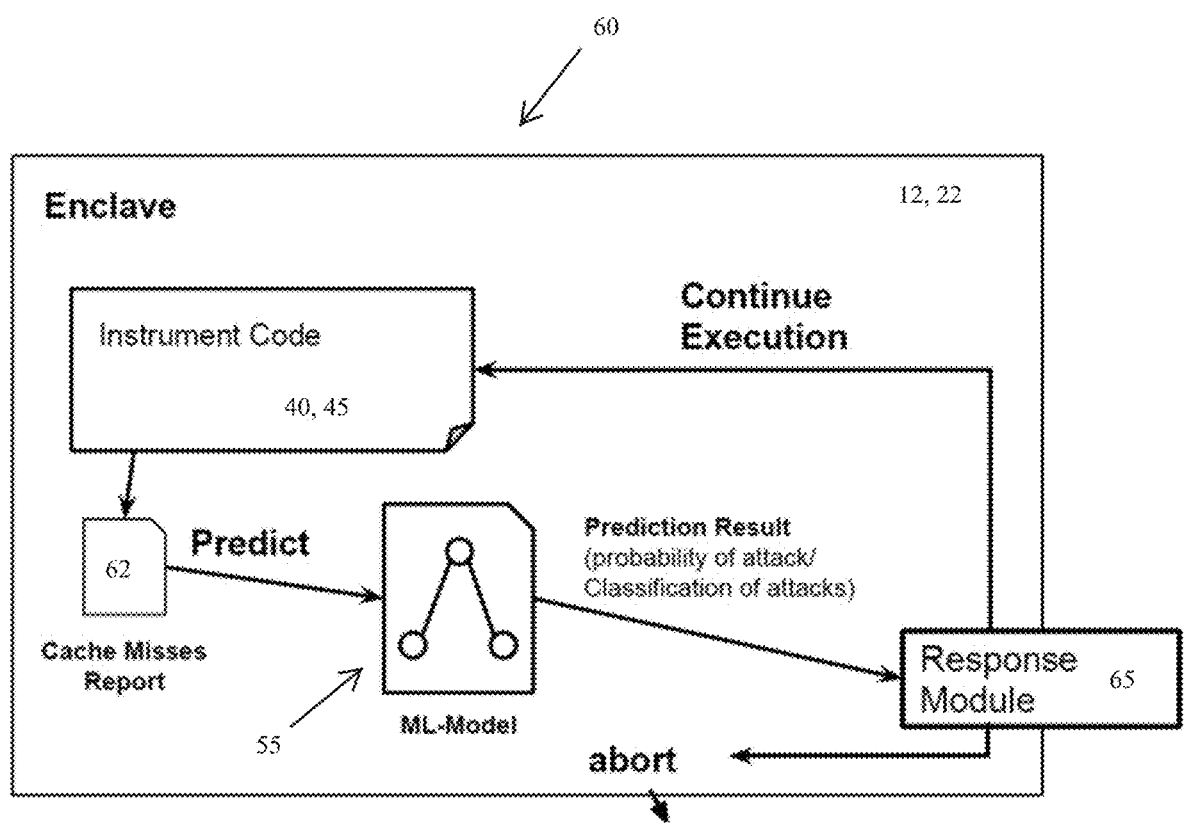
FIG. 6 schematically illustrates a detection phase in an application enclave using instrumented code according to an embodiment of the present invention.

FIG. 6 shows a detection phase 60 according to an embodiment of the present invention. The instrumented code 40 or 45 of the application enclave 12 or 22 is instrumented to periodically invoke the prediction of the classifier using cache misses information, for example a cache misses report 62, collected during the period as features. The prediction results are passed to a response module 65, which may be located within the same application enclave 12 or 22, in another enclave on the same machine, or in a different host, to decide if the application should continue execution or abort.

Embodiments of the present invention provide for the following improvements/advantages:
1) Using a timer thread that continuously increments a variable so that applications on the same host can monitor the time required to execute a piece of code and, in turn, infer the number of cache misses caused by the execution of that piece of code; and/or
2) Using the number of cache misses inferred in the previous step to infer, using a machine-learning classifier, the occurrence of a cache-based side-channel.

An embodiment of the present invention provides a method for detecting cache-based side-channel attacks, the method comprising the steps of:
1) Creating a timer thread that continuously increments a variable,
2) Instrumenting the code of an application so that the application can use the variable incremented by the timer thread to infer the time taken for running a given piece of code, and, in turn, the number of cache misses during that execution, and
3) Determining, by means of a classification system that takes as input the number of cache misses obtained at the previous step, whether the application is under a cache-based side-channel attack.

Since embodiments of the present invention do not use OS services such as performance counters or trusted sources of times, these embodiments enable detection of cache-based side-channel attacks in a scenario where the OS does not provide such services or where the OS is not trusted to provide such services.

While it could be possible to design an alternative heuristic to detect cache misses, such a design would not provide the accuracy and/or security provided by embodiments of the present invention. For example, cache misses may be inferred by an external application that monitors the cache of a given application. However, monitoring from outside of the application requires trust and will likely provide less accurate results since the external application may not know what piece of code the monitored application is running.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the present invention. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting a cache-based side-channel attack, the method comprising:
utilizing a timer thread that continuously increments a variable in code of an application that has been instrumented such that the instrumented code uses the variable incremented by the timer thread to infer an amount of time taken for running a part of the code;
determining a number of cache misses during execution of the part of the code based on the amount of time; and
determining whether the application is experiencing the cache-based side-channel attack using a classifier which uses as input the number of cache misses.

2. The method according to claim 1, wherein the number of cache misses is determined by comparing the amount of time to a threshold.

3. The method according to claim 1, wherein the application runs in a trusted execution environment implemented on a host machine that also runs a further application outside of the trusted execution environment, the application and the further application running on different cores of the host machine and sharing last-level cache.

4. The method according to claim 1, wherein the timer thread is implemented separately from a main thread of the application.

5. The method according to claim 4, wherein the timer thread is implemented in a same trusted execution environment as the application.

6. The method according to claim 4, wherein the application runs in a trusted execution environment, and wherein the timer thread is implemented outside of the trusted execution environment and on a different core of a same host machine on which the application runs than the trusted execution environment.

7. The method according to claim 1, wherein the classifier is trained by running applications in a controlled environment with different cache configurations and/or while running a cache-based side-channel attack, collecting a number of cache misses during execution, and using the number of cache misses to generate a classification model used by the classifier.

8. The method according to claim 1, further comprising aborting execution of the application based on the classifier determining the application is experiencing the cache-based side-channel attack.

9. The method according to claim 1, wherein the timer thread is not a service provided by an operating system running the application.

10. The method according to claim 1, wherein the instrumented code of the application is instrumented to access a computer register containing a current value of the variable at least twice during execution of the part of the code to infer the amount of time taken for running the part of the code.

11. The method according to claim 10, wherein the instrumented code of the application is instrumented to access the computer register before and after each memory access instruction, and wherein the number of cache misses is determined based on a total number of times during execution of the part of the code that a time elapsed for one of the memory access instructions exceeds a threshold.

12. The method according to claim 10, wherein the instrumented code of the application is instrumented to perform a conditional jump and to access the computer register before and after the conditional jump.

13. A system comprising one or more processors which, alone or in combination, are configured to provide for execution of a method comprising:
utilizing a timer thread that continuously increments a variable in code of an application that has been instrumented such that the instrumented code uses the variable incremented by the timer thread to infer an amount of time taken for running a part of the code;
determining a number of cache misses during execution of the part of the code based on the amount of time; and
determining whether the application is experiencing the cache-based side-channel attack using a classifier which uses as input the number of cache misses.

14. The system according to claim 13, wherein the application runs in a trusted execution environment implemented on a host machine that also runs a further application outside of the trusted execution environment, the application and the further application running on different cores of the host machine and sharing last-level cache.

15. A tangible, non-transitory computer-readable medium having instructions thereon which, upon being executed by one or more processors, alone or in combination, provide for execution of a method comprising:
utilizing a timer thread that continuously increments a variable in code of an application that has been instrumented such that the instrumented code uses the variable incremented by the timer thread to infer an amount of time taken for running a part of the code;
determining a number of cache misses during execution of the part of the code based on the amount of time; and
determining whether the application is experiencing the cache-based side-channel attack using a classifier which uses as input the number of cache misses.

16. The method according to claim 1, wherein the variable is shared with a main thread of the application, the main thread including the instrumented code which is instrumented to access a computer register containing a current value of the variable at least twice during execution of the part of the code to infer the amount of time taken for running the part of the code.

17. The method according to claim 16, wherein the main thread of the application is running in a trusted execution environment, and wherein the timer thread is running in the same trusted execution environment or on a different core of a same host machine that runs the application than the trusted execution environment.

18. The method according to claim 17, wherein the timer thread does not use a timer or counter service provided by an operating system of the host machine.

19. The method according to claim 17, wherein an additional application is running in a separate trusted execution environment on the same host machine that runs the application, and wherein the variable is shared by the main thread of the application and a main thread of the additional application.

20. The method according to claim 1, wherein the timer thread increments the variable using a busy loop.

\* \* \* \* \*